(12) United States Patent  (10) Patent No.: US 7,690,177 B2
Spitzley                    (45) Date of Patent:     Apr. 6, 2010

(54) TRACTOR MOUNTED STRING TRIMMER MECHANISM

(76) Inventor: Larry W. Spitzley, 12716 Boyer Rd., Muliken, MI (US) 48861

( * ) Notice: Subject to any disclaimer, the term of this patent is extended or adjusted under 35 U.S.C. 154(b) by 0 days.

(21) Appl. No.: 11/683,107

(22) Filed: Mar. 7, 2007

(65) Prior Publication Data

US 2008/0216459 A1 Sep. 11, 2008

(51) Int. Cl.
*A01D 34/00* (2006.01)
(52) U.S. Cl. .......................... 56/14.9; 56/15.9
(58) Field of Classification Search ............. 56/10.8, 56/10.9, 11.9, 12.7, 13.5–13.8, 14.7, 14.9–15.3, 56/15.5, 15.9, 16.7, 17.1, 320.1, DIG. 14; 37/468, 903
See application file for complete search history.

(56) References Cited

U.S. PATENT DOCUMENTS

| | | | | |
|---|---|---|---|---|
| 3,535,861 A * | 10/1970 | Fineman | ................. | 56/10.7 |
| 3,729,910 A * | 5/1973 | Hardee | ................. | 56/11.9 |
| 4,663,920 A | 5/1987 | Skovhoj | ................. | 56/12.7 |
| 4,664,405 A * | 5/1987 | Bedis | ................. | 172/298 |
| 4,949,536 A | 8/1990 | Neufeld | ................. | 56/13.7 |
| 5,050,372 A | 9/1991 | Heiskell | ................. | 56/12.7 |
| 5,065,566 A | 11/1991 | Gates | ................. | 56/12.7 |
| 5,159,803 A | 11/1992 | Earley, Jr. | ................. | 56/12.7 |
| 5,167,108 A | 12/1992 | Bird | ................. | 56/13.7 |
| 5,210,997 A * | 5/1993 | Mountcastle, Jr. | ............ | 56/15.2 |
| 5,303,532 A | 4/1994 | Phillips | ................. | 56/12.7 |
| 5,498,067 A * | 3/1996 | Christenson | ........... | 298/23 MD |
| 5,561,969 A | 10/1996 | Sandy | ................. | 56/13.6 |
| 6,056,067 A | 5/2000 | Brown | ................. | 172/111 |
| 6,386,822 B1 * | 5/2002 | Burr | ................. | 414/723 |
| 6,487,838 B2 | 12/2002 | Handlin | ................. | 56/13.7 |
| 6,546,706 B1 | 4/2003 | Nafziger | ................. | 56/13.7 |
| 6,719,349 B2 * | 4/2004 | Moyna | ................. | 296/50 |
| 6,786,030 B2 | 9/2004 | Nafziger | ................. | 56/12.7 |
| 2002/0100266 A1 * | 8/2002 | Greenwell | ................. | 56/12.7 |
| 2004/0154277 A1 * | 8/2004 | Shumate | ................. | 56/12.7 |
| 2005/0050873 A1 * | 3/2005 | Rookes | ................. | 56/14.7 |
| 2005/0193700 A1 * | 9/2005 | Bares | ................. | 56/12.7 |
| 2006/0026940 A1 * | 2/2006 | Cartner | ................. | 56/11.9 |

* cited by examiner

*Primary Examiner*—Thomas B Will
*Assistant Examiner*—Mai T Nguyen
(74) *Attorney, Agent, or Firm*—Young Basile (57) ABSTRACT

A string trimmer mechanism intended for mounting on the front end of a mowing tractor. The mechanism includes a mounting bracket for attachment to the front end of the tractor; an extension power cylinder pivotally mounted on the bracket and extending laterally of the tractor; a string trimmer carried on the free end of the power cylinder and including a hydraulic motor driving a trimmer dish; and a lift power cylinder pivotally mounted on the bracket and driving a lever pivotally mounted on the bracket and carrying a roller positioned under the extension power cylinder. The string trimmer is moved selectively laterally inwardly and outwardly utilizing the extension power cylinder and is moved selectively upwardly and downwardly utilizing the lift power cylinder. The extension power cylinder, lift power cylinder, and hydraulic trimmer motor are selectively supplied with pressurized hydraulic fluid from a pressurized hydraulic fluid source onboard the tractor. The string trimmer mechanism converts between left hand operation, with the string trimmer positioned on the left side of the tractor, and right hand operation, with the string trimmer positioned on the right side of the tractor, simply by reversing the direction in which the extension power cylinder extends from the mounting bracket and by interchanging the pivotal mounting of the lift cylinder and the lever on the mounting bracket.

9 Claims, 9 Drawing Sheets

TRACTOR MOUNTED STRING TRIMMER MECHANISM

BACKGROUND

This invention relates to string trimmers, and more particularly to a string trimmer intended for mounting on the front end of a mowing tractor Conventional mowing tractors, employing a central mower deck beneath the tractor, have the disadvantage of an inability to closely trim or edge around stationary objects such as trees, posts, buildings, headstones and the like. Commonly, the trimming and edging is accomplished by hand using a string trimmer or trimming mower. Such hand edging is time consuming and physically demanding.

In an effort to reduce the total time required for mowing and trimming, proposals have been made to provide a string trimmer attachment for a mowing tractor whereby the mower deck may perform the primary mowing function while the string trimmer mounted on the tractor performs the trimming or edging. However, none of the prior art attempts to include a string trimmer attachment for a mowing tractor have provided a overall mechanism that can readily perform precise trimming while simultaneously providing the primary mowing function.

SUMMARY

This invention is directed to the provision of a tractor mounted string trimmer mechanism that provides precise trimming capability in combination with the primary mowing function.

The string trimmer mechanism of the invention is intended for mounting on the front end of a tractor and includes a mounting structure for mounting to the front end of the tractor; a string trimmer assembly, and a trimmer positioning mechanism interconnecting the mounting structure and the trimmer and operative to move the trimmer laterally relative to the mounting structure.

According to a further feature of the invention, the power trimmer positioning mechanism is further operative to move the trimmer vertically relative to the mounting structure.

According to a further feature of the invention, the trimmer positioning mechanism includes a first power cylinder assembly mounted on the mounting structure and operative to move the trimmer assembly laterally and a second power cylinder assembly mounted on the mounting structure and operative to move the trimmer vertically.

According to a further feature of the invention, the first power cylinder assembly is pivotally mounted at one end thereof on the mounting structure and connected at another end thereof to the string trimmer assembly, and the second power cylinder assembly is operative to pivot the first power cylinder assembly and thereby the string trimmer to thereby raise and lower the string trimmer assembly.

According to a further feature of the invention, the second power cylinder assembly is pivotally mounted at one end thereof on the mounting structure and engages the first power cylinder assembly at another end thereof.

According to a further feature of the invention, the second power cylinder assembly includes a lift power cylinder pivotally mounted on the mounting structure and a lever pivotally mounted on the mounting structure, driven by the lift power cylinder, and engaging the first power cylinder assembly.

According to a further feature of the invention, the first power cylinder assembly includes an extension power cylinder pivotally mounted at one end thereof on the mounting structure and connected at another end thereof to the string trimmer assembly.

According to a further feature of the invention, the lever of the second power assembly comprises a bell crank lever connected at one end thereof to the lift cylinder, pivotally mounted intermediate its ends on the mounting structure, and carrying a roller at its other end positioned beneath the extension power cylinder whereby actuation of the lift power cylinder acts to raise and lower the extension power cylinder and thereby the string trimmer assembly.

According to a further feature of the invention, the string trimmer mechanism further includes a counterbalancing mechanism pivotally mounted on the mounting structure coaxial with the first power cylinder assembly and including a weight positioned in counterbalancing relation to the first power cylinder assembly.

According to a further feature of the invention, the first power cylinder assembly further includes a further cylinder arranged in parallel relation to the extension power cylinder, pivotally mounted at one end thereof on the mounting structure coaxial with the extension power cylinder, and connected at another end thereof to the string trimmer assembly, and the counterbalancing mechanism comprises a beam structure pivotally mounted intermediate its ends on the mounting structure coaxial with the extension power cylinder and the further cylinder, extending at one end between and secured to the extension power cylinder and the further cylinder, and carrying the weight at the other end thereof.

According to a further feature of the invention, the mounting structure comprises a mounting bracket, means for mounting the mounting bracket centrally on the front end of the tractor, and means for mounting the trimmer positioning mechanism, interchangeably, in a first positioned extending to the left of the mounting bracket whereby to position the string trimmer assembly on the left side of the tractor and in a second position to the right of the mounting bracket whereby to position the string trimmer assembly on the right side of the tractor.

The invention also provides a tractor including a body structure including a front end and a rear end, a seat positioned on the body structure, front wheels positioned proximate the front end of the tractor, rear wheels positioned proximate the rear end of the tractor, a prime mover, a mower deck positioned beneath the body structure between the front and rear ends and driven by the prime mover, a pump driven by the prime mover and operative to provide an onboard source of pressurized hydraulic fluids, characterized in that the tractor further includes a string trimmer mechanism including a hydraulic string trimmer positioning mechanism mounted on the front end of the tractor and arranged to receive pressurized hydraulic fluid from the onboard source and a string trimmer assembly mounted on the string trimmer positioning mechanism in a position lateral of the body structure, and the hydraulic string trimmer positioning mechanism is operative in response to receipt of pressurized hydraulic fluid from the onboard source to selectively vary the lateral position of the string trimmer assembly relative to the tractor front end.

According to a further feature of the invention, the tractor mounted string trimmer assembly includes a hydraulic motor arranged to receive pressurized hydraulic fluid from the onboard source to power the string trimmer.

According to a further feature of the invention, the string trimmer positioning mechanism includes an extension hydraulic cylinder assembly extending laterally of the front end of the tractor with the string trimmer assembly mounted on a free end thereof.

According to a further feature of the invention, the extension hydraulic cylinder assembly is pivotally mounted at one end thereof on the front end of the tractor with the string trimmer assembly mounted on the other, free end thereof, and the string trimmer positioning mechanism further includes a lift hydraulic cylinder assembly arranged to receive pressurized hydraulic fluid from the onboard source in operative response to receipt of pressurized hydraulic fluid to pivot the extension cylinder and thereby selectively raise and lower the string trimmer assembly relative to the tractor support surface.

According to a further feature of the invention, the string trimmer mechanism further includes a mounting structure fixedly secured to the front end of the tractor and the extension cylinder assembly includes an extension hydraulic cylinder pivotally mounted at one end thereof on the mounting structure.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
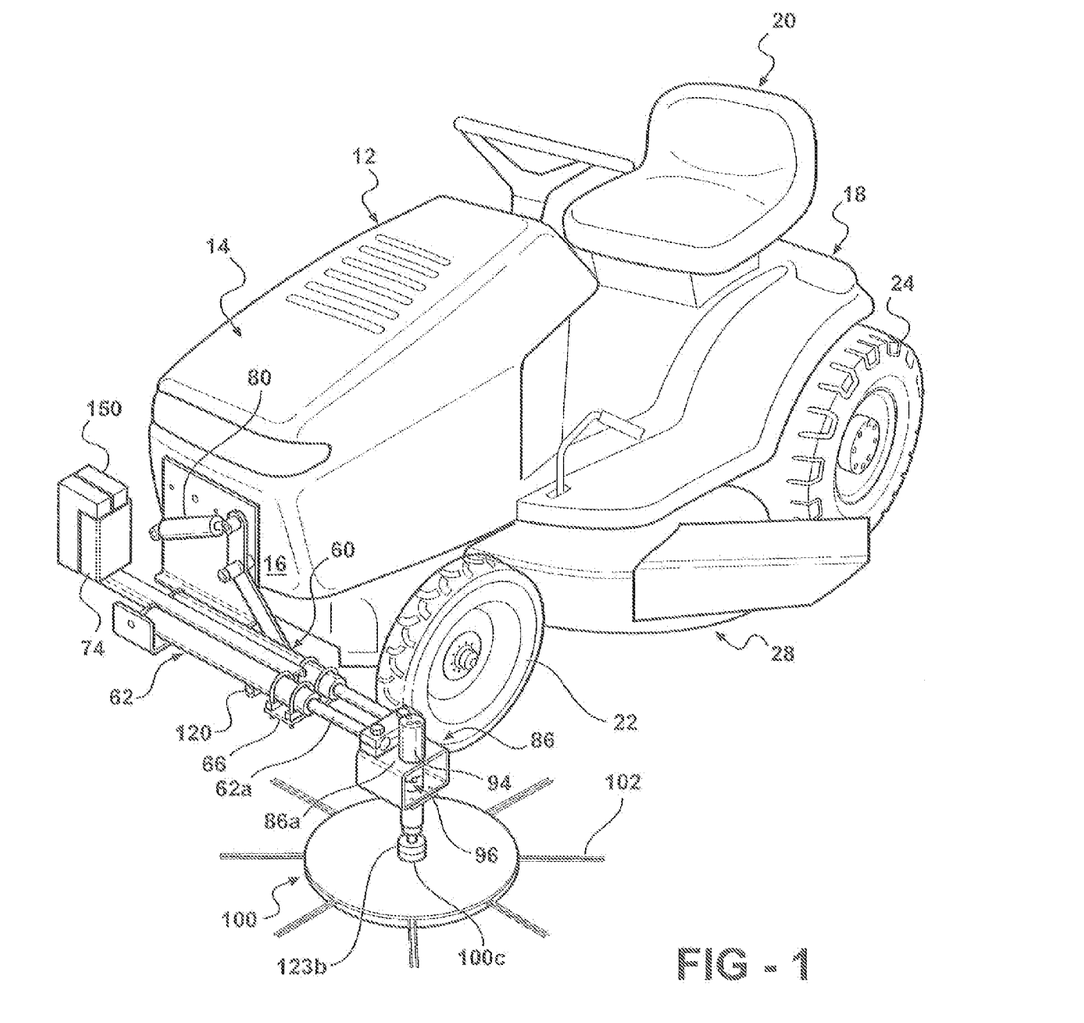
FIG. 1 is a ¾ perspective view of a tractor equipped with a string trimmer mechanism according to the invention.
Figure 2:
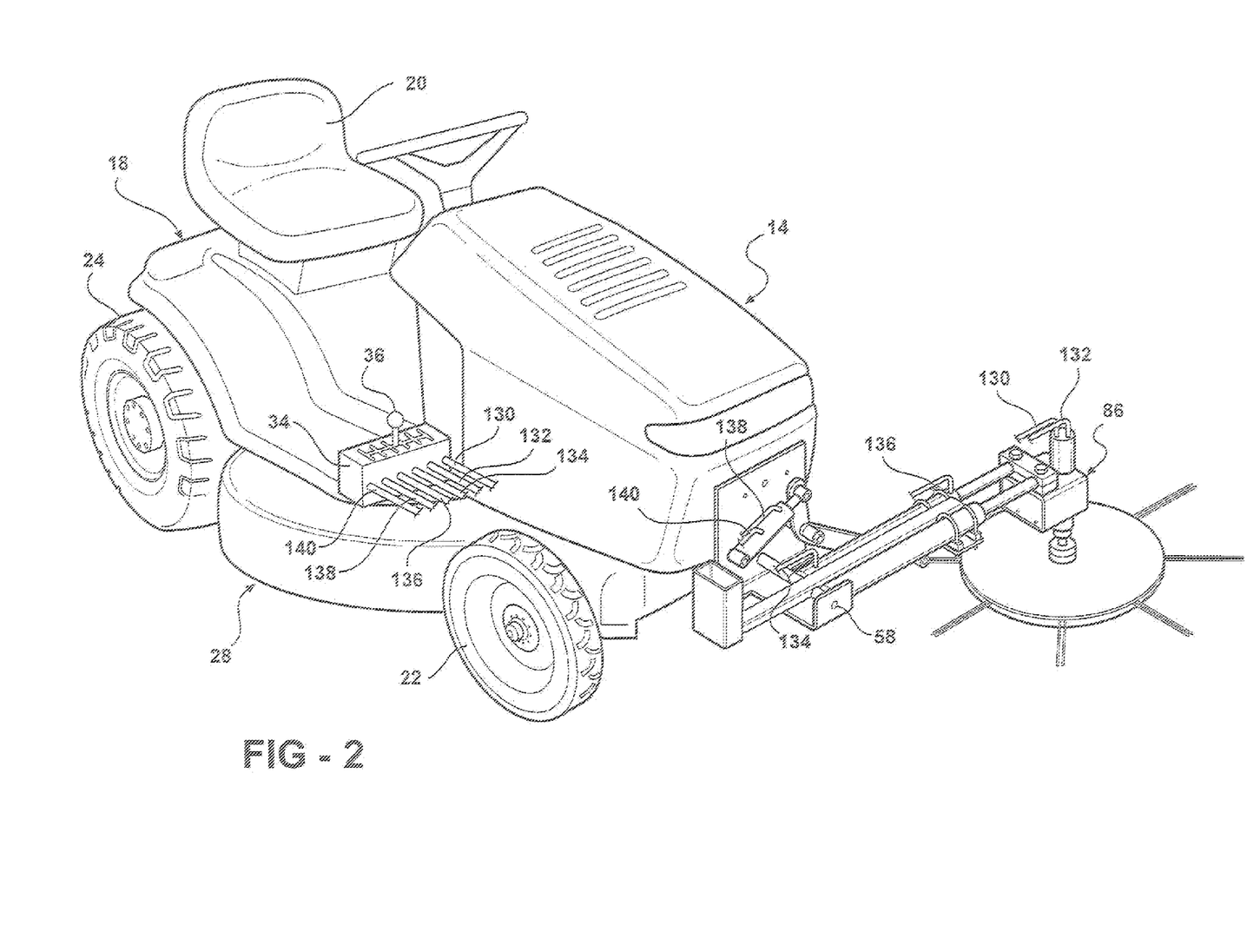
FIG. 2 is an opposite ¾ perspective view of the tractor with the string trimmer mechanism.
Figure 3:
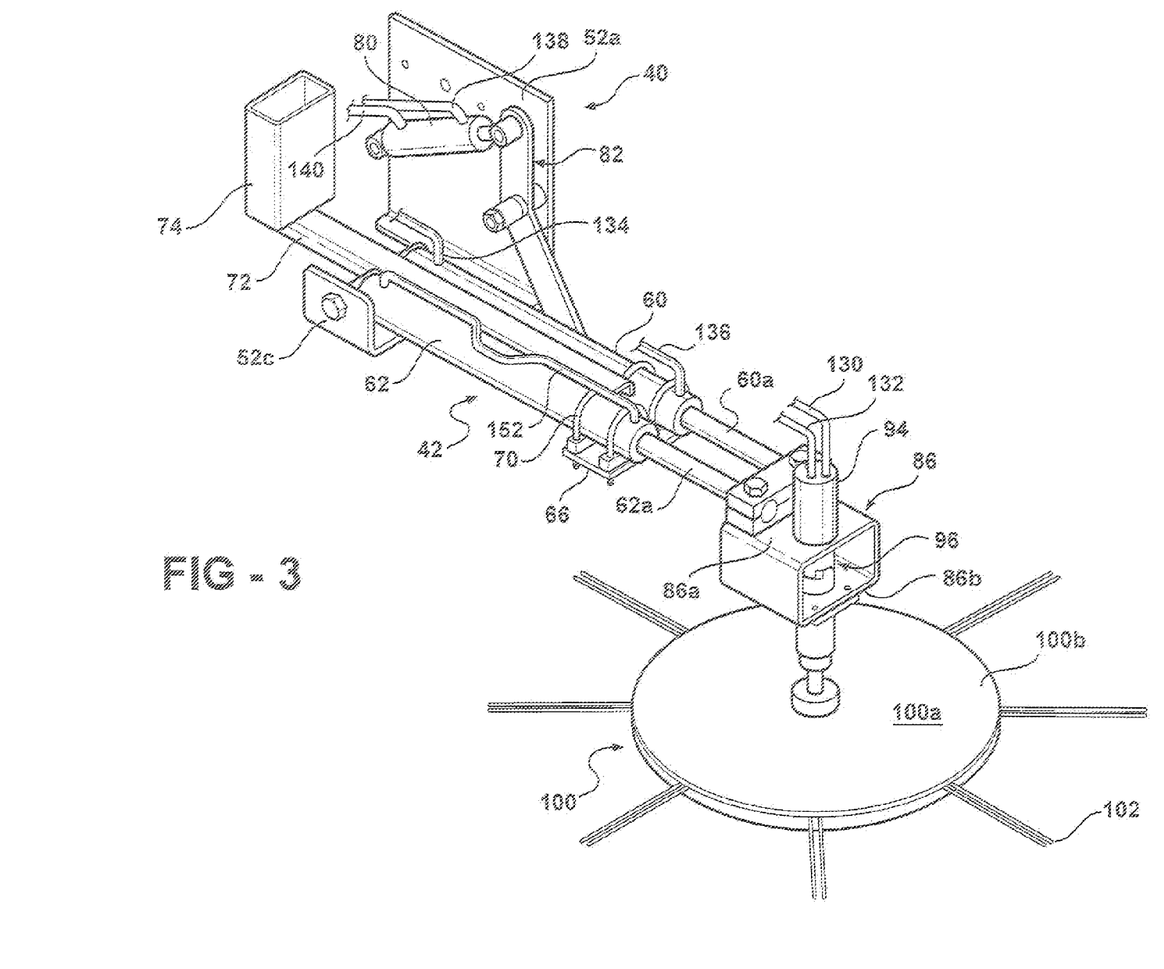
FIG. 3 is a perspective view of the string trimmer mechanism.
Figure 4:
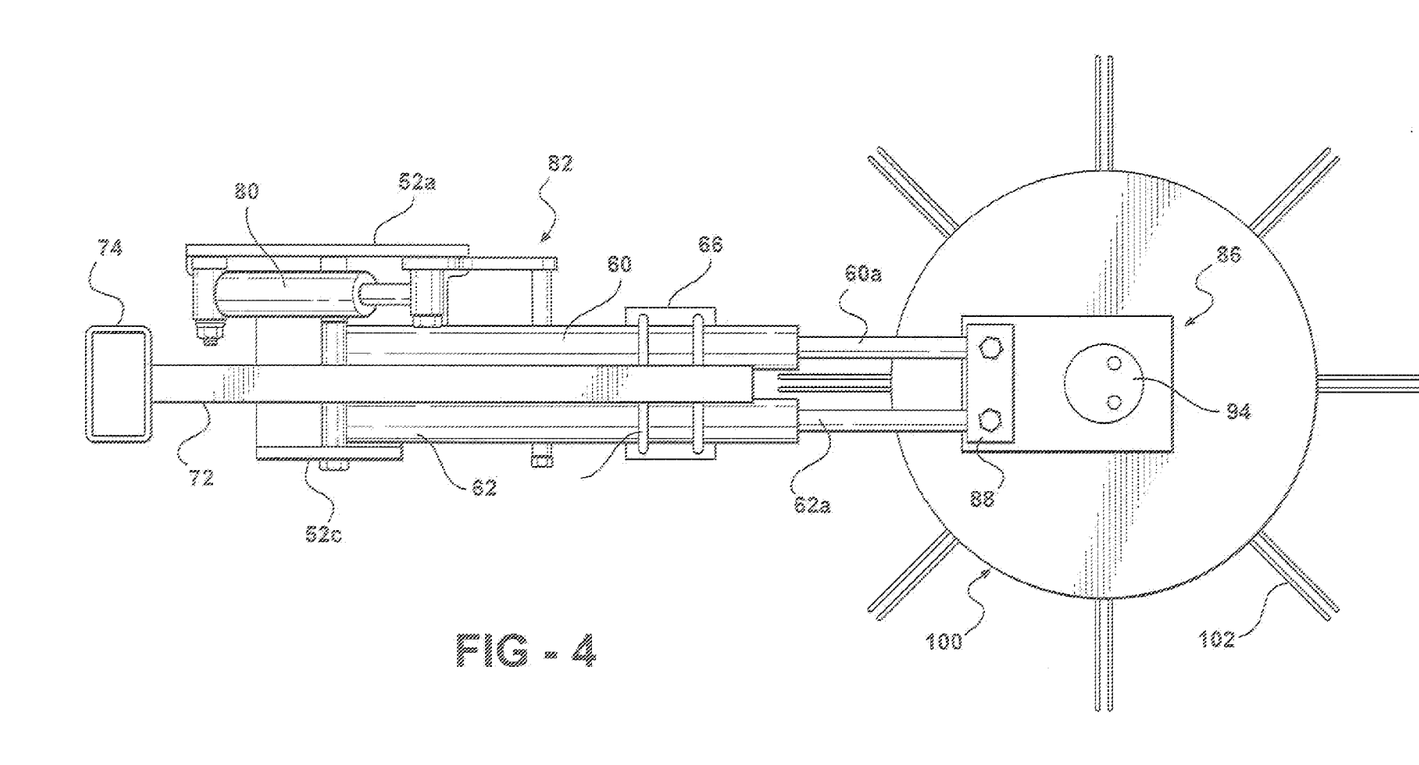
FIG. 4 is a top view of the string trimmer mechanism.
Figure 5:
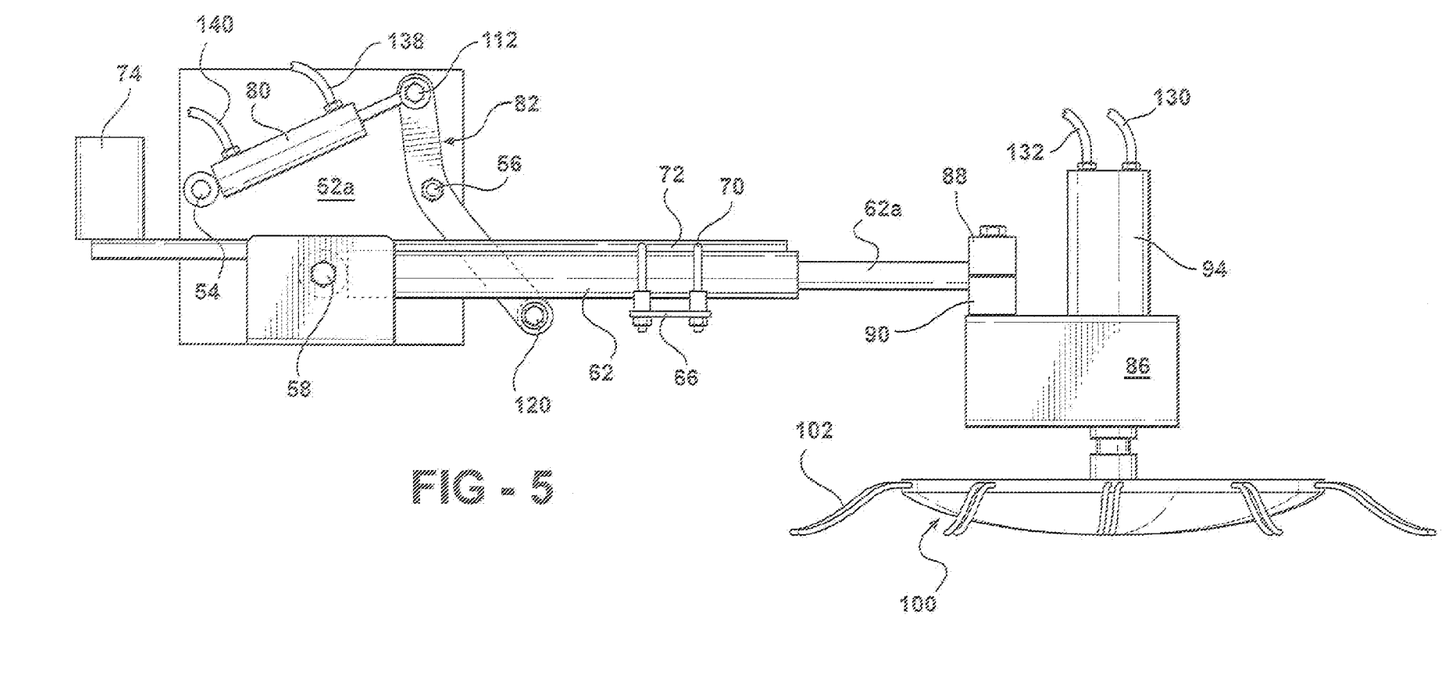
FIG. 5 is a side elevational view of the string trimmer mechanism with the string trimmer mechanism in a lowered position.
Figure 6:
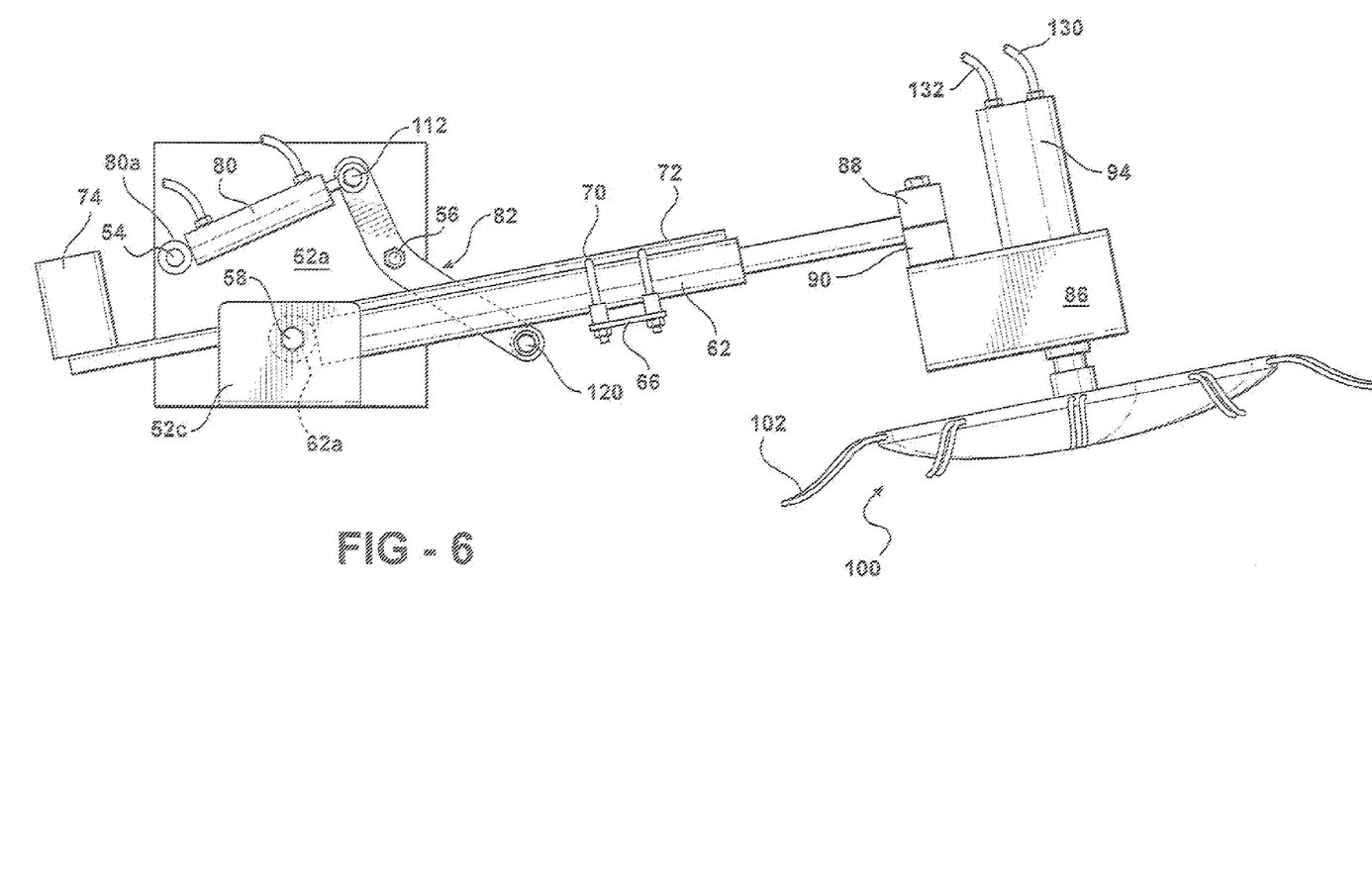
FIG. 6 is a side elevational view of the string trimmer mechanism with the string trimmer mechanism in a raised position.
Figure 8:
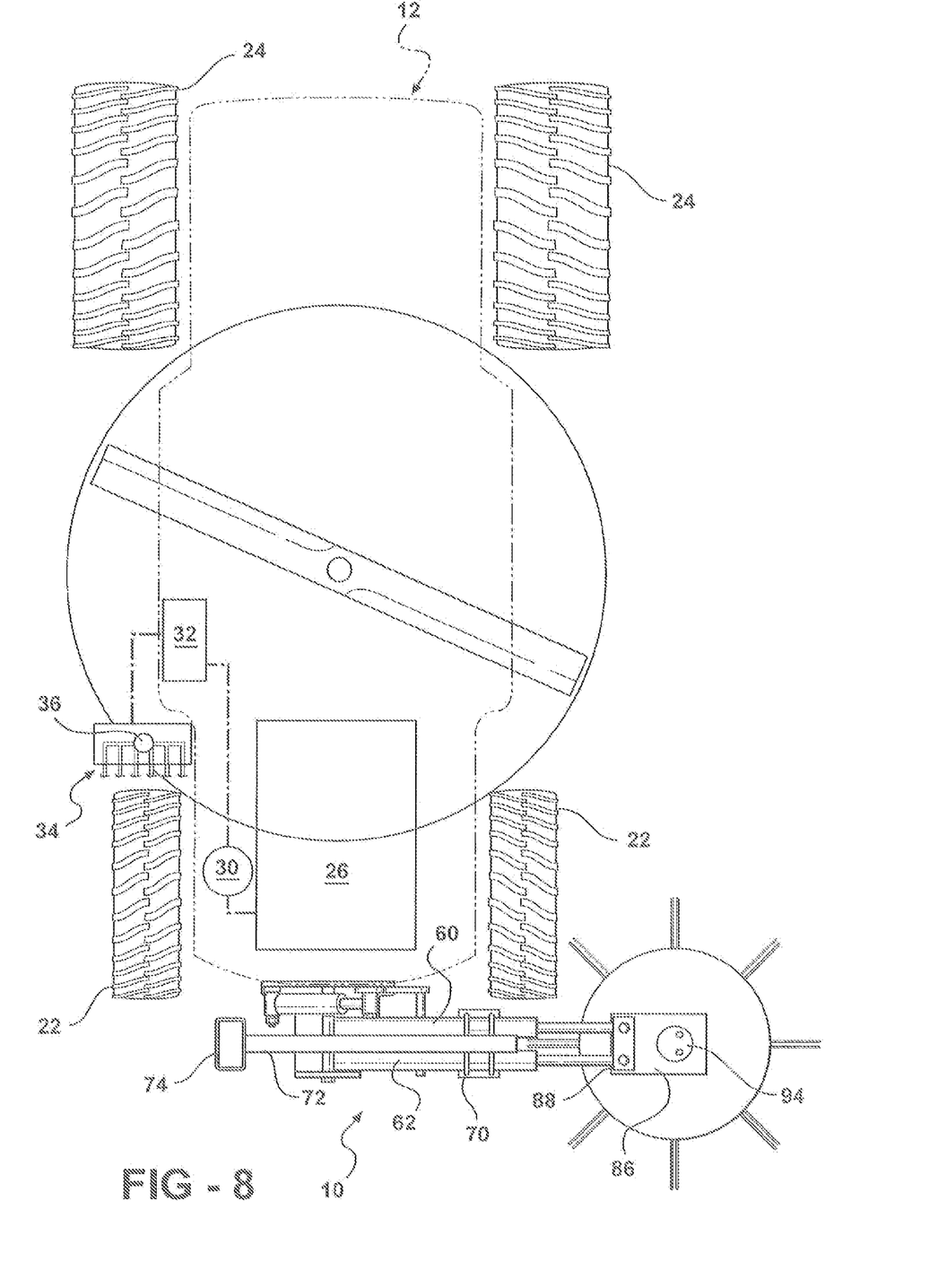
FIG. 8 is a schematic view of the tractor and string trimmer mechanism.

The string trimmer mechanism 10 of the invention is seen in FIGS. 1, 2 and 8 mounted on a tractor 12.

Tractor 12 includes a body structure 14 including a front end 16, a rear end 18, and a front end mounting structure 19 at the lower central front end of the body structure; a seat 20 positioned on the body structure; front wheels 22 positioned proximate the front end 16 of the body structure; rear wheels 24 positioned proximate the rear end 18 of the body structure; a prime mover 26; a mower deck 28 positioned beneath the body structure between the front and rear wheels and driven in known manner by the prime mover; a pump 30 driven by the prime mover and operative to deliver pressurized hydraulic fluid to an onboard source 32 of pressurized hydraulic fluid, and a control valve assembly 34 including a joy stick 36 accessible to an operator positioned on the seat 20 and operative to selectively route pressurized hydraulic fluid to selected hydraulic power devices String trimmer mechanism 10, broadly considered, includes a mounting bracket assembly 40, an extension cylinder assembly 42, a counterbalancing assembly 44, a lift cylinder assembly 46, a string trimmer assembly 48, and a shield 50.

Figure 7:
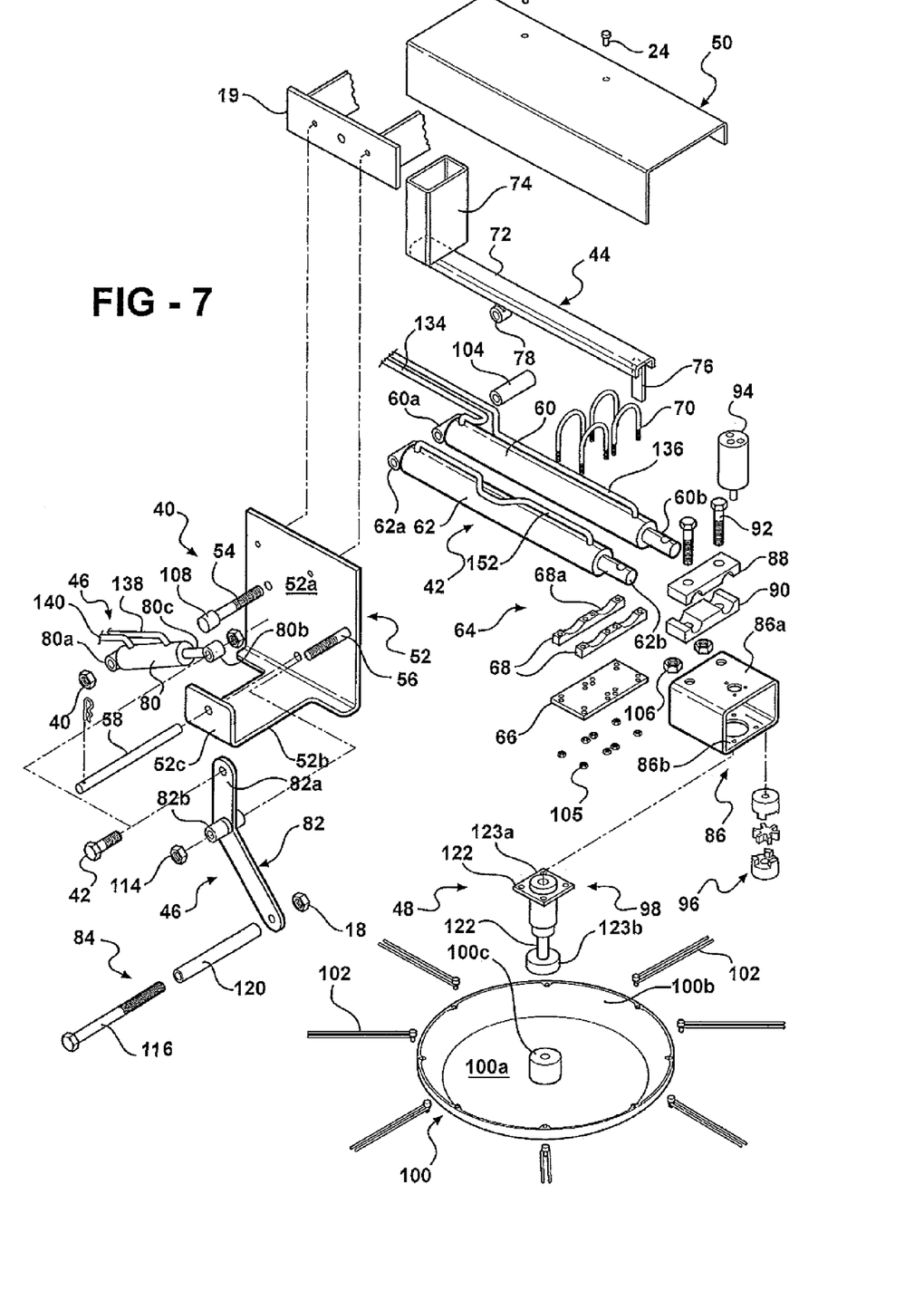
FIG. 7 is an exploded perspective view of the string trimmer mechanism.

Mounting bracket assembly 40 includes a bracket 52 and pivot pins 54, 56 and 58.

Bracket 52 includes a main body upstanding plate portion 52a and a finger portion 52b extending forwardly from plate portion 52a and terminating in an upstanding lip 52c. Pins 54 and 56 extend fixedly forwardly from plate portion 52a and pin 58 is fixedly positioned in aligned apertures in lip 52c and plate portion 52a in parallel relation to pins 54, 56.

Extension cylinder assembly 42 includes a power hydraulic cylinder 60, a Further cylinder 62, and a clamp assembly 64. Clamp assembly 64 includes a plate 66, a pair of clamps 68, and a plurality of bails 70.

Counterweight assembly 44 includes a beam 72, a weight holder 74 at one end of the beam, a finger 76 at the other end of the beam, and a pivot 78 intermediate the ends of the beam.

Lift cylinder assembly 46 includes a hydraulic lift cylinder 80, a bell crank lever 82 and a roller assembly 84.

String trimmer assembly 48 includes a tubular member 86, upper and lower clamps 88 and 90, clamp bolts 92, a hydraulic motor 94, a coupler 96, a spindle assembly 98, a dish 100, and a plurality of strings or flails 102.

In the assembled relation of the string trimmer mechanism, pivot 62a of further cylinder 62, pivot 60a of hydraulic cylinder 60, and pivot 78 of beam 44 are journaled on pin 58 with pivot 78 positioned between pivots 62a and 60a and with a spacer 104 positioned on pin 58 between pivot 60a and mounting bracket plate portion 52a; clamps 68 are positioned beneath the outboard ends of cylinders 60, 62 with the lower peripheries of the cylinders received in concavities 68a defined by the clamps and with bails 70 positioned over the upper peripheries of the cylinders and passing through apertures in the clamps 68 and apertures in plate 66 for threaded engagement with nuts 105 whereby to fixedly clamp the outboard ends of the cylinders together; finger 76 is welded to the upper face of plate 66 between cylinders 60/62; clamps 88 and 90 are positioned on the upper face of tube 86 with the free ends of piston rods 60b/62b of cylinders 60/62 clamped between the upper and lower clamps and with bolts 92 passing downwardly through apertures in upper clamp 88, piston rods 60b/62b, lower clamp 90, and the upper wall 86a of tube 86 for threaded engagement with nuts 106 whereby to fixedly secure the clamps 88 and 90 to tube 86 and fixedly secure the piston rods 60b/62b to clamps 88/90; pivot 80a on one end of lift cylinder 80 is journaled on pin 54 with a spacer 108 maintaining the cylinder in spaced relation to the plate portion 52a of the mounting bracket and with a nut 110 engaging the outboard end of pin 54 to preclude displacement of cylinder 80; a pivot 80b on the outboard end of piston rod 80c of cylinder 80 is journaled on a pin 112 fixedly secured to the upper end 82a of bell crank 82; a pivot 82b intermediate the ends of bell crank 82 is journaled on pin 56 and held in place by a nut 114; pin 116 of roller assembly 84 is fixedly mounted on the lower end 82b of bell crank 82 by a nut 118; roller 120 of roller assembly 84 is journaled on pin 116 and is positioned beneath cylinder 60/62 in rolling engagement with the underfaces of the cylinders; hydraulic motor 94 is fixedly secured to the upper wall 86a of tube 86; coupling 96 is positioned in alignment with and in driving engagement with the output shaft of motor 94 between the upper 86a and lower 86b walls of tubular member 86; spindle assembly 98 extends downwardly from coupling 96 and includes a journal 122 secured to the lower wall 86b of tube 86 and a drive shaft 123 guided in the journal 122, drivingly connected at its upper end 123a to coupling 96, and secured at its lower end 123b to a central hub 100c on the lower wall 100a of dish 100; flails or strings 102 are connected to and extend radially outwardly from the rim 100b of dish 100 in doubled fashion; and shield 50 is secured to beam 72 utilizing fasteners 124 with the shield positioned in cosmetic and protective overlying relation to cylinders 60/62.

In use, the string trimmer mechanism is fixedly and centrally secured to the front end 16 of tractor 12 utilizing suitable fasteners passing through suitable apertures in the upper region of plate portion 52a of mounting bracket 52 for engagement with tractor front end mounting structure 19. Thus centrally mounted to the front end of the tractor, cylinder 60/62 extend laterally of the tractor to position string trimmer 48 laterally of the tractor.

Pressurized hydraulic fluid is delivered to hydraulic motor 94 via conduits 130/132; pressurized hydraulic fluid is delivered to power cylinder 60 via conduits 134/136; and pressurized hydraulic fluid is delivered to lift cylinder 80 via conduits 138, 140. All of the conduits are suitably routed to control valve assembly 34 so as to enable the tractor operator to selectively deliver an exhaust pressurized fluid from the various hydraulic devices utilizing joy stick 36 in known manner.

In use of the tractor equipped with the string trimmer mechanism of the invention, the tractor is suitably directed to allow the mower deck 28 to perform the primary mowing operation while the string trimmer mechanism is selectively manipulated to perform required trimming operations around stationary objects such as fences, posts, trees, walls, guardrails, headstones, and the like. Specifically, as the tractor moves forwardly to allow the mower deck to perform the primary mowing operation, the string trimmer will be moved laterally outwardly and inwardly utilizing cylinder 60 and raised or lowered utilizing cylinder 80 to allow the flails 102 to selectively and precisely trim around stationary objects.

Suitable suitcase weights 150 positioned in weight holder 74 serve to provide a counterbalancing effect while a conduit 52 interconnecting the respective ends of further cylinder 62 allow fluid to be transferred between the opposite sides of the cylinder piston so that the further cylinder 62, while not powering the lateral movement of the string trimmer, stabilizes the movement and renders the movement more positive.

Figure 9:
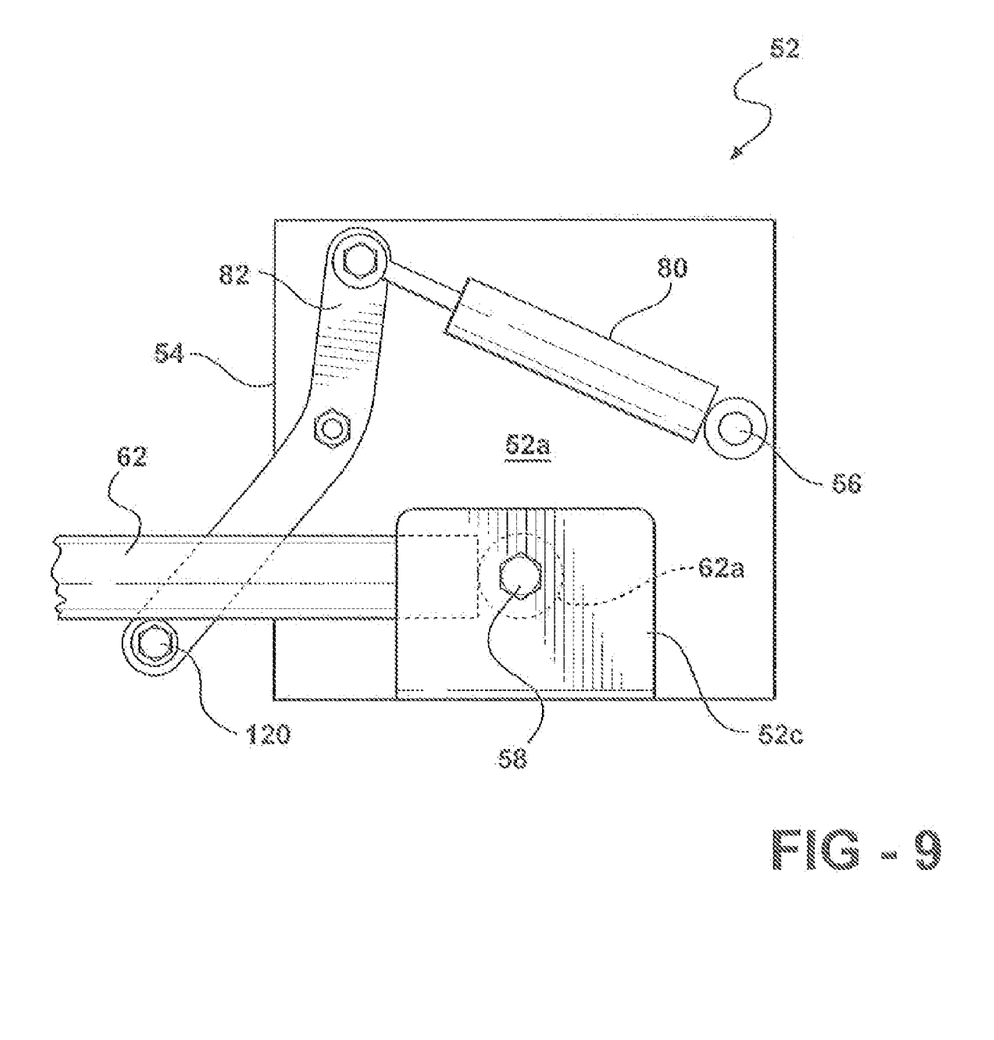
FIG. 9 is a fragmentary view showing an alternate configuration for the string trimmer mechanism.

The string trimmer mechanism may be readily converted between left hand operation, with the string trimmer positioned on the left side of the tractor, and right hand operation, with the string trimmer position on the right side of the tractor, simply by reversing the direction in which the cylinders 60/62 extend from the pivot pin 58 and by interchanging the pivotal mounting of the lift cylinder 80 and the lever 82 on the pivot pins 54 and 56. Specifically, for the left hand operation shown in FIGS. 1-8, cylinders 60/62 extend to the left of pivot pin 58, lift cylinder pivot 80a is mounted on pivot pin 54, and lever 82 is mounted on pin 56, and for right hand operation, as seen in FIG. 9, cylinders 60/62 extend to the right of pivot pin 58, lift cylinder pivot 80a is mounted on pivot pin 56, and lever 82 is mounted on pivot pin 54. The conversion of the string trimmer mechanism from left hand operation to right hand operation is quickly and easily performed without skilled labor and requires no special or alternate parts.

The invention string trimmer mechanism provides a ready and efficient means of mowing and trimming simultaneously with a consequent significant reduction in total mowing and trimming time; operates totally off of existing tractor hydraulics so as not to require any extra gas motors or PTO shafts; converts readily from right hand to left hand operation with no additional parts; is effectively counterbalanced for smooth operation; and fits all tractors from 20 to 35 hp with a hydraulic system providing a minimum flow of 7.5 gallons per minute.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A string trimmer mechanism intended for mounting on a front end of a tractor comprising:
    a mounting structure for mounting on the front end of the tractor and including a vertical planar plate member and first and second spaced parallel pivot pins fixedly secured to an extending forwardly from the plane of the plate member;
    a string trimmer assembly;
    a trimmer positioning mechanism interconnecting the mounting structure and the trimmer assembly and including an extension power cylinder pivotally mounted at one end thereof on the first pivot pin and connected at another end thereof to the string trimmer assembly and operative to move the trimmer assembly laterally relative to the first pivot pin; and
    a lift power cylinder assembly including a lift power cylinder pivotally mounted at one thereof on the second pivot pin and operative to pivot the extension power cylinder vertically about an axis of the first pivot pin and thereby raise and lower the trimmer assembly;
    the mounting structure further including a third pivot pin extending forwardly from the plane of the plate member in spaced parallel relationship to the first and second pivot pins and the lift power cylinder further including a lever pivotally mounted intermediate its ends on the third pivot pin, connected at one end thereof to the lift power cylinder, and carrying a roller at its other end positioned beneath the extension power cylinder whereby actuation of the lift power cylinder acts to raise and lower the extension power cylinder and thereby the string trimmer assembly.

2. The string trimmer mechanism according to claim 1 wherein the string trimmer mechanism further includes a counterbalancing mechanism pivotally mounted on the first pivot pin and including a weight positioned in counterbalancing relation to the extension power cylinder.

3. The string trimmer mechanism according to claim 2 wherein:
    the string trimmer mechanism further includes a further cylinder arranged in parallel side-by-side relation to the extension power cylinder, pivotally mounted at one end thereof on the first pivot pin, and connected at another end thereof to the string trimmer assembly; and
    the counterbalancing mechanism comprises a beam structure pivotally mounted intermediate its ends on the first pivot pin, extending at one end between and secured to the extension power cylinder and the further cylinder, and carrying the weight at the other end thereof.

4. A string trimmer mechanism according to claim 1 wherein the trimmer positioning mechanism further includes a further cylinder arranged in parallel side-by-side relation to the extension power cylinder, pivotally mounted at one end thereof on the first pivot pin, and connected at another end thereof to the string trimmer assembly.

5. A mowing tractor including a body structure including a front end and a rear end, a seat positioned on the body structure, front wheels positioned proximate the front end of the tractor, rear wheels positioned proximate the rear end of the tractor, a prime mover, a central mower deck positioned beneath the body structure between the front and rear wheels, driven by the prime mover, and operative to cut a mower swath along a forward path of travel of the tractor, and a pump driven by the prime mover and operative to provide an onboard source of pressurized hydraulic fluid, characterized in that:

the tractor further includes a string trimmer mechanism including a mounting structure including a vertical planar mounting plate fixedly secured to the front end of the tractor and first and second pivot pins fixedly secured to and extending forwardly from the plane of the mounting plate in parallel spaced relationship, a hydraulic extension power cylinder pivotally mounted at one end thereof on the first pivot pin and arranged to receive pressurized hydraulic fluid from the onboard source, and a string trimmer assembly mounted on another end of the extension hydraulic power cylinder in a position lateral of the body structure and operative to cut a circular trimmer swath;

the hydraulic extension power cylinder extends laterally from the first pivot pin and is operative in response to receipt of pressurized hydraulic fluid from the onboard source to selectively vary the lateral position of the string trimmer assembly relative to the tractor front end between a laterally inboard position in which the circular swath overlaps the mower swath and a laterally outboard position laterally outwardly of the inboard position;

the string trimmer mechanism further includes a lift cylinder assembly including a lift hydraulic cylinder pivotally mounted at one end thereof on the second pivot pin and operative to pivot the extension power cylinder about an axis of the first pivot pin and thereby raise and lower the string trimmer assembly; and the mounting structure further includes a third pivot pin extending forwardly from the plane of the plate member in parallel spaced relation to the second pivot pin and the lift cylinder assembly further includes a lever pivotally mounted intermediate its ends on the third pivot pin, pivotally connected at one end thereof to another end of the lift hydraulic cylinder, and carrying a roller at another end thereof positioned beneath the extension hydraulic cylinder.

6. The tractor according to claim 5 wherein the string trimmer mechanism further includes a counterbalancing mechanism pivotally mounted on the first pivot pin and including a weight positioned in counterbalancing relation to the extension power cylinder.

7. The tractor according to claim 6 wherein the tractor further includes a further cylinder arranged in parallel side-by-side relation to the extension hydraulic cylinder, pivotally mounted at one end thereof on the first pivot pin, and connected at another end thereof to the string trimmer assembly.

8. A tractor according to claim 5 wherein:

the first pivot pin extends forwardly from and is positioned centrally of the front end of the tractor;

the extension power cylinder is interchangeably movable between a first position in which one end of the extension power cylinder is pivotally mounted on the first pivot pin and the extension power cylinder extends to the left of the first pivot pin, whereby to position the string trimmer assembly to the left of the tractor, and a second position in which one end of the extension power cylinder is pivotally mounted on the first pivot pin and the extension power cylinder extends to the right of the first pivot pin, whereby to position the string trimmer assembly to the right of the tractor;

with the extension power cylinder extending to the left of the first pivot pin, one end of the lift cylinder is pivotally mounted on the second pivot pin, the lever is pivotally mounted intermediate its ends on the third pivot pin, the other end of the lift cylinder is pivotally connected to one end of the lever, and the other end of the lever engages the extension power cylinder; and with the extension power cylinder extending to the right of the first pivot pin, one end of the lift cylinder is pivotally mounted on the third pivot pin, the lever is pivotally mounted intermediate its ends on the second pivot pin, the other end of the lift cylinder is pivotally connected to one end of the lever, and the other end of the lever engages the extension power cylinder.

9. A mowing tractor according to claim 5 wherein the string trimmer mechanism further includes a further cylinder arranged in parallel side-by-side relation to the extension power cylinder, pivotally mounted at one thereof on the pivot pin and connected at another end thereof to the string trimmer assembly.

* * * * *